United States Patent [19]

Miyano et al.

[11] Patent Number: 4,664,076

[45] Date of Patent: May 12, 1987

[54] INTAKE SYSTEM FOR INTERNAL COMBUSTION ENGINE

[75] Inventors: Hideyo Miyano; Atsushi Kobayashi; Shigeru Suzuki, all of Saitama; Katsumi Ichida, Tokyo, all of Japan

[73] Assignee: Honda Giken Kogyo Kabushiki Kaisha, Tokyo, Japan

[21] Appl. No.: 744,929

[22] Filed: Jun. 14, 1985

[30] Foreign Application Priority Data

Jun. 15, 1984 [JP] Japan .................................. 59-123130
Jun. 18, 1984 [JP] Japan .................................. 59-124827

[51] Int. Cl.$^4$ ............................................. F02B 75/18
[52] U.S. Cl. ............................................. 123/52 MB
[58] Field of Search .......... 123/52 M, 52 MV, 52 MB, 123/432

[56] References Cited

U.S. PATENT DOCUMENTS 4,304,211 12/1981 Tezuka et al. ...................... 123/432
4,538,556 9/1985 Takeda ............................ 123/52 MB
4,545,331 10/1985 Ito et al. ........................... 123/52 M
4,565,166 1/1986 Takeda ............................. 123/52 M

FOREIGN PATENT DOCUMENTS 105272 10/1938 Australia .......................... 123/52 M Primary Examiner—Craig R. Feinberg
Attorney, Agent, or Firm—Lyon & Lyon

[57] ABSTRACT

An air intake system for an internal combustion engine wherein the intake port to a combustion cylinder is connected to a trunk portion of the intake system which contains the throttle valve. A high speed intake passage of a relatively short length and a slow speed intake passage of a relatively long length are both connected to the trunk portion with a control valve in the high speed intake passage. The control valve is opened for high speed operation of the engine and closed for slow speed operation to operatively select between the two intake passages. In modified embodiments the degree of opening of the control valve is modulated in proportion to the r.p.m. of the engine.

8 Claims, 5 Drawing Figures

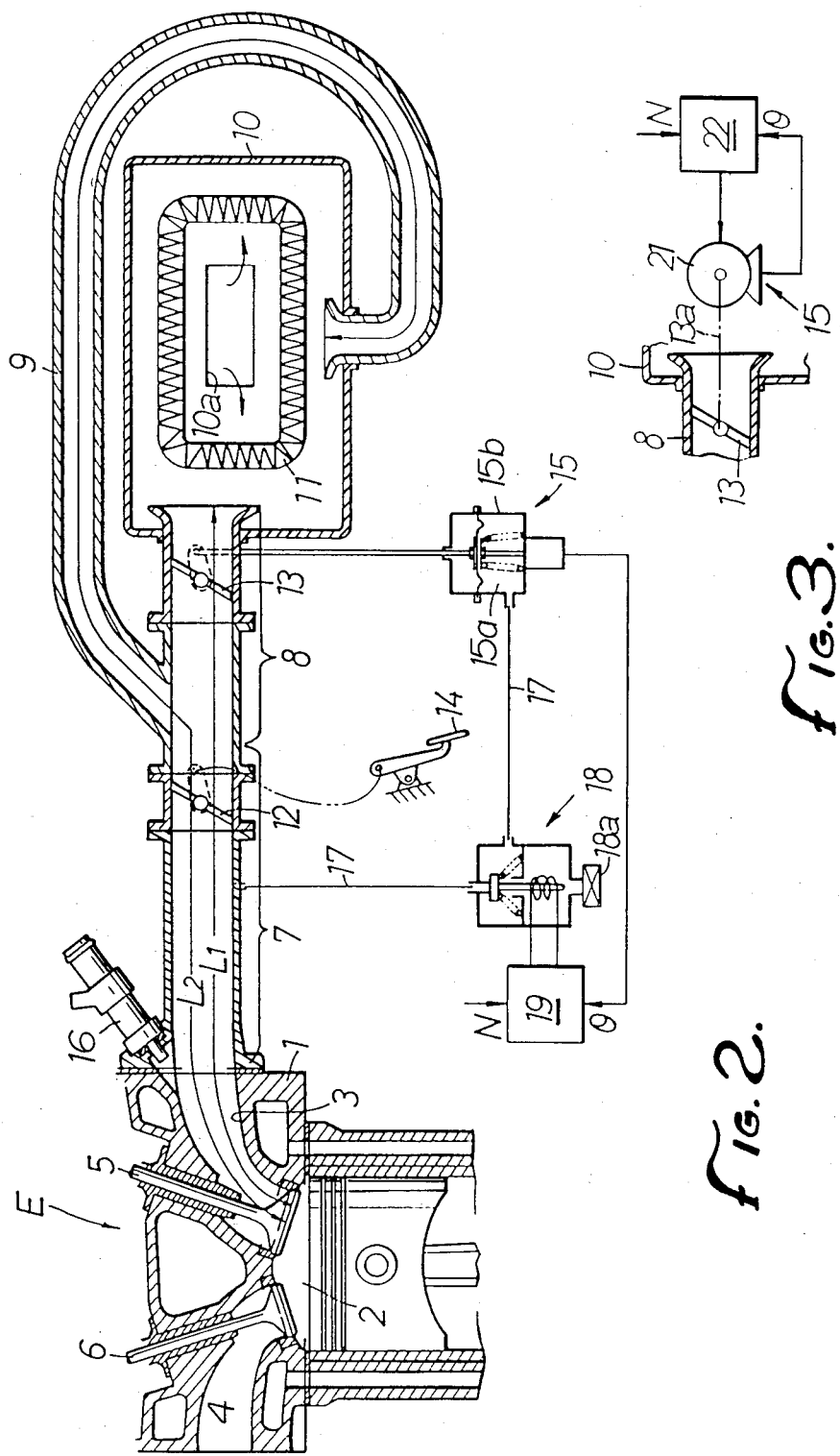

INTAKE SYSTEM FOR INTERNAL COMBUSTION ENGINE

The present invention relates to an intake system for an internal combustion engine in which two separate intake passages of different lengths are provided for use at different speeds of engine operation, namely, a fast intake passage and a slow intake passage longer than the fast intake passage that are connected in parallel to the upstream end of a trunk intake passage merging into an intake port of the internal combustion engine and in which a control valve is selectively operated in accordance with fast and slow running states of said engine so that the engine charge efficiency is enhanced by the inertial effect of intake air to improve the engine output.

In at least one prior art intake system of this kind, as shown in U.S. Pat. No. 3,814,069, the respective entrances of the fast and slow intake passages are connected to a common intake chamber which has its inlet equipped with the throttle valve to be actuated by the accelerator. In such a construction, the length from the intake valve to the throttle valve of the engine is so large that the volume of the intake passage becomes excessive. The intake passage volume has a large influence upon the stability of the idling of the engine which has a tendency to become more unstable as the volume becomes larger. As a counter-measure for that tendency, the idling r.p.m. of the engine is usually set at a higher than normal value in the prior art which is undesirable for fuel economy and engine smoothness.

Therefore, the present invention has an object to provide an intake system of the aforementioned type, in which a throttle valve is located near the combustion cylinder intake valve so that the intake passage volume in the section from the intake valve to the throttle valve is a small value without being influenced by the fast and slow intake passages, whereby the idling stability of the engine is improved and whereby the fast and slow intake passages can be properly shaped and sized for the best output performance of the engine.

A further object of this invention is to provide such an improved intake system wherein a control valve is selectively operated to open the shorter fast intake passage at higher engine speeds and, still further, to coordinate the degree of opening of that control valve with the engine r.p.m. for improving the engine operating characteristics over the full range of engine speed operations.

The present invention will be described in connection with three embodiments illustrated in the drawings as connecting the intake system to a single combustion chamber of an internal combustion engine but it will be understood by those skilled in the art that the invention is equally applicable to multicylinder engines. The drawings are as follows:

FIG. 2 is a sectional elevation similar to FIG. 1 of a second embodiment of the invention.

FIG. 3 is a fragmentary sectional elevation of a portion of an intake system similar to FIGS. 1 and 2 showing a third embodiment of just the portion that differs from FIGS. 1 and 2.

Figure 1:
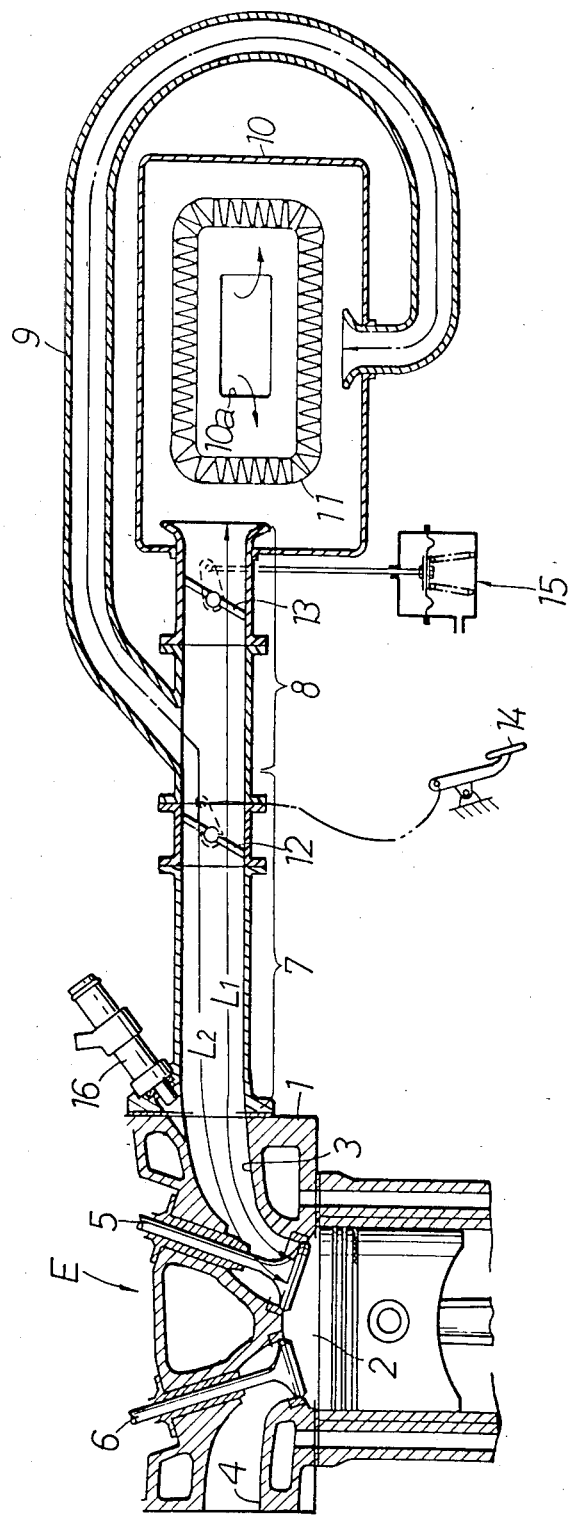
FIG. 1 is a sectional elevation, with portions shown diagrammatically, of the first embodiment of the intake system of this invention.

Referring now to the first embodiment of FIG. 1, an engine E has its cylinder head 1 formed with a combustion chamber 2 and intake and exhaust ports 3 and 4 which are opened in the ceiling face of the combustion chamber 2. The intake and exhaust ports 3 and 4 are adapted to be opened and closed by intake and exhaust valves 5 and 6, respectively, in the usual manner.

The intake port 3 has its outer end open to the outer side face of the cylinder head 1 and merges into a trunk intake passage 7. At the upstream end of this trunk intake passage 7, there are connected in parallel a fast intake passage 8 and a slow intake passage 9 which is longer than the fast intake passage 8. The fast intake passage 8 is larger in cross-sectional area than the slow intake passage 9 and merges directly into the trunk intake passage 7 to provide a smaller intake resistance than that of the slow intake passage 9.

The total length $L_1$ of the intake port 3, the trunk intake passage 7 and the fast intake passage 8 is established to provide the optimum charge efficiency for the engine E during high speed operation by the inertial effect of the intake air. On the other hand, the total length $L_2$ of the intake port 3, the trunk intake passage 7 and the slow intake passage 9 is established to provide the optimum charge efficiency for the engine E during slow speed operation by the intake inertial effect. This total length $L_2$ is longer than the length $L_1$ by the difference between the lengths of the fast and slow intake passages 8 and 9.

The entrances to both the fast and slow intake passages 8 and 9 are in a common intake chamber 10. An air intake port 10a is formed in one side of that intake chamber 10, and an air cleaner 11 for cleaning the air taken in from the air intake port 10a is operatively positioned in the intake chamber 10 between the intake port 10a and the entrances to the passages 8 and 9.

The trunk intake passage 7 is equipped with a throttle valve 12 and the fast intake passage 8 is equipped with a control valve 13. The throttle valve 12 is connected to an accelerator control such as an accelerator pedal 14. The control valve 13 is connected to an actuator 15. This actuator 15 normally holds the control valve 13 in a closed state by reason of an internal spring but opens the control valve in a responsive manner when the engine E is running at a predetermined fast speed.

A fuel injection nozzle 16 is attached to the side wall of the downstream of the trunk intake passage 7 for injecting fuel toward the intake valve 5 during the suction stroke of the engine E.

The operation of this embodiment is as follows. When the engine E is running slowly, the actuator 15 is in an inoperative state so that the fast intake passage 8 is shut off by the control valve 13. As a result, the air drawn from the air intake port 10a into the intake chamber 10 as the intake stroke of the engine E advances is drawn consecutively through the slow intake passage 9, the trunk intake pasage 7 and the intake port 3 into the combustion chamber 2. The suction rate of the intake air is adjusted by the throttle valve 12.

Since the throttle valve 12 is disposed in the trunk intake passage 7, the volume of the intake passage in the section from the intake valve 5 to the throttle valve 12 is relatively small as a result of the location of the throttle valve 12 not being influenced by the fast and slow intake passages 8 and 9. As a result, the boost vacuum is stabilized even during idling of the engine when the throttle valve 12 is closed to the idle opening position. When the throttle valve 12 is abruptly opened from the idle opening for accelerating the engine speed, the boost vacuum is changed in instant response thereto so that a satisfactory acceleration of the engine E is achieved. Moreover, the fuel economy is improved and the engine idles smoothly at a low speed, in contrast to the prior art systems.

The total length $L_2$ of the intake port 3, the trunk intake passage 7 and the slow intake passage 9 is established at a relatively large value so that the charge efficiency is enhanced to the maximum by the intake inertial effect in the slow running condition of the engine E. As a result, the slow output performance of the engine E can be satisfied in a substantially fully closed state of the throttle valve 12.

When the engine E speed is increased to a predetermined fast running state, the actuator 15 operates to open the control valve 13 and accordingly the fast intake passage 8. The air drawn into the intake chamber 10 in accordance with the suction stroke of the engine E passes through the fast intake passage 8, the trunk intake passage 7 and the intake port 3 to the combustion chamber 2. The fast intake passage 8 has a smaller intake resistance than that of the slow intake passage 9 due to passage 8 being shorter and larger in cross-section than passage 9.

The total length $L_1$ of the intake port 3, the trunk intake passage 7 and the fast intake passage 8 is established at a relatively small value so that the charge efficiency is enhanced to the maximum by the intake inertial effect in a predetermined fast run of the engine E. As a result, the fast output performance of the engine E is satisfied in the substantially fully open state of the throttle valve 12. By the resonance effect of the intake chamber 10, the charge efficiency is further enhanced so that the fast output performance is further improved.

With the aforedescribed first embodiment of this invention, it is contemplated that the control valve 13 will be fully closed during operation of the engine below a predetermined r.p.m. and will be fully open during operation above that predetermined r.p.m. Since the lengths $L_1$ and $L_2$ of the two intake passages are established for optimum performance at two substantially different engine speeds or ranges of speeds, the engine performance at speeds between those two different speeds or ranges is not maximized, although it may be improved over prior art arrangements. The second and third embodiments of this invention, as illustrated in FIGS. 2 and 3, provides a further improvement of this intake system. Most of the components and their operations of the second and third embodiments are identical to those of the first embodiment, and therefore the same numerals have been used in FIGS. 2 and 3 to identify like components and their descriptions will not be repeated here in full.

Referring now to FIG. 2, the intake system again includes an intake port 3, an intake trunk 7 with a throttle valve 12, a fast intake passage 8 with a control valve 13, a slow intake passage 9 connected to passage 8 downstream of control valve 13, and an intake chamber 10 with an air filter and an intake port 10a. The accelerator pedal 14 is connected to and operates the throttle valve 12. The control valve 13 is connected to and operated by the actuator or controller 15 which may be similar in construction as the actuator 15 of the first embodiment but is operated in a different manner to a full range of positions between open and closed.

The opening controller 15 of this second embodiment of FIG. 2 is constructed of a vacuum actuator 15b which is operatively connected to the control valve 13, a normally-closed type electromagnetic valve 18 which is disposed in a vacuum passage 17 for connecting a vacuum chamber 15a of that vacuum actuator 15b with the trunk intake passage 7 downstream of the throttle valve 12, and a central processing unit 19 for sending a valve opening signal to the electromagnetic valve 18. The electromagnetic valve 18 provides communication of its atmosphere vent port 18a with the vacuum chamber 15a of the vacuum actuator 15b when in its closed state, and communication of the vacuum passage 17 from the intake trunk 7 with the vacuum chamber 15a when in its open state. The central processing unit 19 compares an input signal N corresponding to the engine r.p.m. and an input signal $\theta$ corresponding to the operating stroke of the vacuum actuator 15b (i.e., the degree of opening of the control valve 13).

The operation of this second embodiment will be described in the following. While the engine E is running, the central processing unit 19 continually compares the signal N corresponding to the engine r.p.m. and the signal $\theta$ corresponding to the actuation stroke of the vacuum actuator and produces a valve opening signal to the electromagnetic valve 18 when the r.p.m. signal N has a value larger than a predetermined r.p.m. for that value of the signal $\theta$. This causes the electromagnetic valve 18 to be opened and therefore the boost vacuum of the engine E is then introduced into the vacuum chamber 15a of the vacuum actuator 15b to actuate the control valve 13 in an opening direction. When the signal $\theta$ represents a predetermined r.p.m. value larger than the actual r.p.m. signal N, the output signal of the central processing unit 19 is interrupted. As a result, the electromagnetic valve moves to a closed position to cause the vacuum chamber 15a to communicate with the atmosphere vent port 18a so that the vacuum actuator 15b actuates the control valve 13 in a closing direction by the force of an internal return spring. Thus, the control valve 13 continually is modulated toward an opening which is proportionate to the engine r.p.m.

In a very slow running range of the engine E, such as at idle and slightly faster, the control valve 13 is controlled to the fully closed position to shut off the fast intake passage 8. As a result, the air drawn from the air intake port 10a into the intake chamber 10 in accordance with the suction stroke of the engine E flows only through the intake passage composed of the slow intake passage 9, the trunk intake passage 7 and the intake port 3 until it is drawn into the combustion chamber 2. As with the first embodiment, the length $L_2$ of the above-defined intake passage for slow engine operation has a relatively large length so that the charge efficiency is enhanced to the maximum by the intake inertial effect in the slow running range of the engine E, as has been described hereinbefore.

When the engine E is operating in a medium running speed range, the control valve 13 is controlled to a medium opening corresponding to the engine r.p.m. to suitably open the fast intake passage 8. As a result, the intake air from the intake chamber 10 is divided at an appropriate ratio to flow through the slow intake passage 9 and the fast intake passage 8 to correspond to the opening of the control valve 13. This results in a reduction in the intake resistance from the condition where control valve 13 is completely closed and therefore the engine E does not experience a charge efficiency reduction so that it can continue to exhibit the high output for the position of the throttle valve 12.

When the engine E is operated in a fast running speed range, the control valve 13 is controlled to its fully open state to connect the fast intake passage 8 to the engine. As a result, the intake air from the intake chamber 10 flows almost exclusively through the fast intake passage 8 which has a lower intake resistance than the slow intake passage 9 and then through the trunk intake passage 7 and intake port 3 to the combustion chamber 2. Again, as with the first embodiment, the length $L_1$ of the intake passage at this time is set to have a relatively small length so that the charge efficiency is enhanced to the maximum by the intake inertial effect in the predetermined fast running range of the engine E, as has been described hereinbefore.

Figure 4:
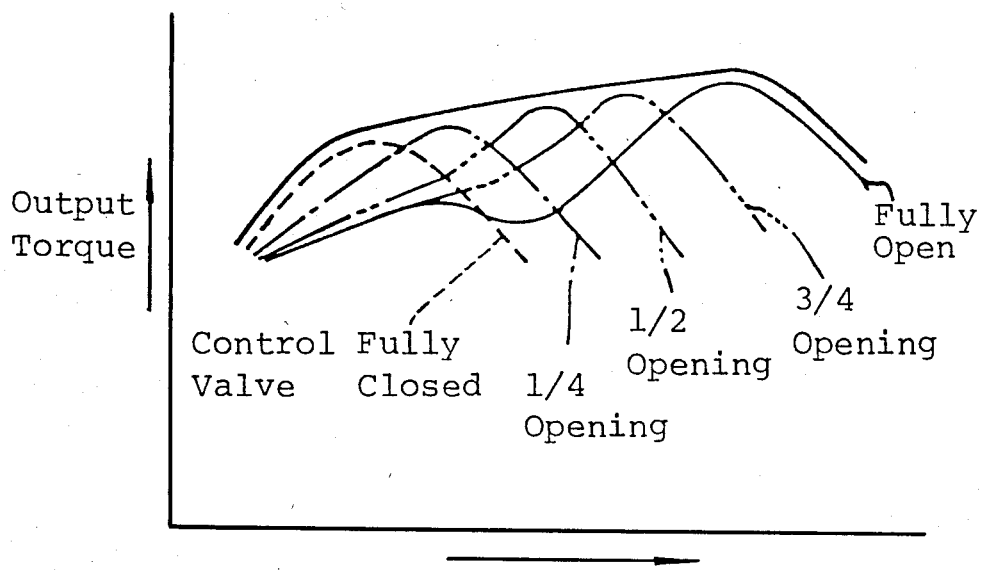
FIG. 4 is a graph of the performance curves of an engine having the intake system of FIGS. 2 and 3.
Figure 5:
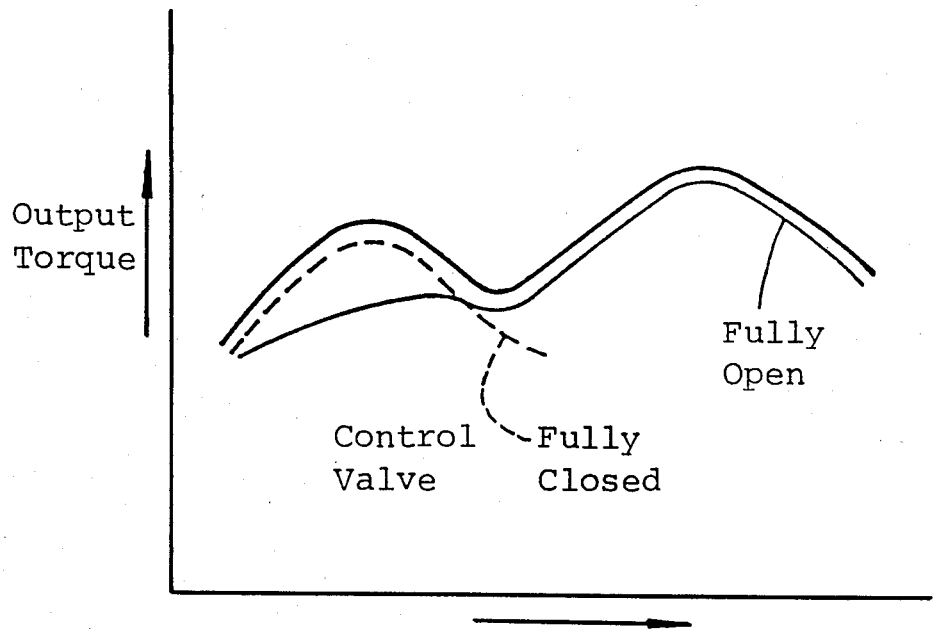
FIG. 5 is a graph of the performance curves of an engine having the intake system of FIG. 1.

With this arrangement for modulating the position of the control valve 13 relative to the engine r.p.m., the output torque of the engine E has more nearly flat characteristics over a wide range of the engine r.p.m. as shown in FIG. 4. This is in contrast to the substantial drop or valley in torque output that occurs when the control valve 13 is only moved between two positions, open and closed, as in the first embodiment, as shown by the graph of FIG. 5.

FIG. 3 shows a third embodiment of the present invention similar to the second embodiment but which is different from the second embodiment in the construction of the opening controller 15 of the control valve 13. Specifically, the opening controller 15 of the third embodiment is constructed of a pulse motor 21 which is connected to the stem 13a of the control valve 13 and a central processing unit 22 for outputting a turning signal to that pulse motor 21. That unit 22 compares the input signal N corresponding to the engine r.p.m. and the input signal $\theta$ corresponding to the rotational position of the pulse motor 21 (i.e., the opening of the control valve 13) thereby to control the pulse motor 21 such that the control valve 13 is set to an opening which is proportionate to the engine r.p.m.

As has been described hereinbefore, in the second and third embodiments of the present invention, the control valve in the fast intake passage is modulated to an opening that is proportionate to the engine r.p.m. As a result, the high engine torque output can be maintained even in a medium running range of the engine so that the engine exhibits flat and high output characteristics over a wide running range from low to high speeds.

It should be noted that when the present invention is applied to a multi-cylinder internal combustion engine it is desirable for all the fast and slow intake passages 8 and 9 of the respective cylinders to be connected to a common intake chamber 10 and, of course, the throttle valves 12 and control valves 13 to be synchronized with each other.

What is claimed:

1. An intake system for an internal combustion engine having an intake port to the combustion cylinder, comprising, a trunk intake passage connected to the intake port, a throttle valve mounted in said trunk intake passage, a pair of intake passages of substantially different lengths directly connected at respective upstream ends thereof into a common intake chamber at spaced locations along said intake chamber, the longer of said pair of intake passages extending substantially about said intake chamber and being connected and being connected at its downstream end directly to said trunk intake passage of said throttle valve, the shorter of said pair of intake passages having a downstream end merging at an acute angle into the downstream end of the longer of said pair of intake passages just prior and towards said trunk intake passage relative to airflow going through the passages such that the airflow through the pair of intake passages into the trunk intake passage is promoted, a control valve mounted in said upstream end of the shorter of said pair of intake passages, and actuator means for operating said control valve in response to engine speed to close said control valve at low engine speeds.

2. The intake system of claim 1 wherein the degree of opening of said control valve is modulated in relation to engine r.p.m.

3. The intake system of claim 1 wherein means are provided for fully opening said control valve above a predetermined engine r.p.m. and completely closing said control valve below that predetermined engine r.p.m.

4. The intake system of claim 1 wherein controller means are provided for causing said actuator means to vary the degree of opening of said control valve in relation to the engine speed between a closed position at idle and full open at high speeds.

5. The intake system of claim 4 wherein said controller means includes a valve means for selectively connecting to one of a source of vacuum and atmospheric pressure, said actuator means includes a vacuum chamber for causing operation thereof, and means operatively connecting said valve means to said vacuum chamber for supplying one of a vacuum and atmospheric pressure to said vacuum chamber.

6. The intake system of claim 5 wherein a central processing unit is provided and has means for detecting and comparing the engine r.p.m. and degree of opening of said control, and said central processing unit being operatively connected to said valve means for causing said selective connection to one of a source of vacuum and atmospheric pressure for maintaining the control valve opening proportionate to the engine r.p.m.

7. The intake system of claim 4 wherein said actuator means includes a pulse motor operatively connected to the control valve.

8. The intake system of claim 7 wherein said controller means includes a central processing unit for detecting and comparing the engine r.p.m. and degree of control valve opening and having means for operating said pulse motor in response to said comparison.

* * * * *